United States Patent Office 3,562,109
Patented Feb. 9, 1971

3,562,109
HYDRAULIC FALL-BRAKE OR SHOCK ABSORBER FOR NUCLEAR REACTOR CONTROL RODS
Helmut Bezold, Hohenschwarz, and Eckhard Steinkamp, Erlangen, Germany, assignors to Siemens Aktiengesellschaft, Berlin, Germany, a corporation of Germany
Continuation of application Ser. No. 609,061, Jan. 13, 1967. This application June 10, 1968, Ser. No. 751,638
Claims priority, application Germany, Jan. 14, 1966, S 101,449
Int. Cl. G21c 7/20; F16f 9/14
U.S. Cl. 176—36     7 Claims

ABSTRACT OF THE DISCLOSURE

Hydraulic shock absorber for a control rod in a nuclear reactor is formed of a vertically extending guide tube for guidingly receiving a falling control rod. The guide tube is cylindrical substantially along the entire length thereof and has longitudinally spaced cylindrical constrictions at the lower end thereof. Openings are provided in the guide tube above the constrictions ot permit reactor coolant fluid to pass therethrough.

---

This application is a continuation of copending application Ser. No. 609,061, filed on Jan. 13, 1967, now abandoned.

Our invention relates to hydraulic fall-brake or shock absorber for nuclear reactor control rods.

Nuclear reactors are normally provided with control rods for adjusting the required operating conditions. The control rods, however, have a second purpose, namely to deactivate the reactor in the event of an excursion. For this purpose, the control rods are inserted completely into the reactor core, an act normally accomplished as a falling or dropping movement. The control rods must be braked however, at the end of this falling movement because otherwise damage would occur within the reactor core and to the control rod proper. Consequently, a great many types of shock absorbers or fall-brakes have already been proposed heretofore. In particular, hydraulic shock absorbers are now known wherein the control rod extends into the end portion of a guide tube that is, for example, conically shaped. The operation of other embodiments is based on the principle of piston and cylinder, the end of the control rod guide tube being narrowed or reduced in diameter along the remainder of its length to form a liquid bumper or cushion. These known devices, however, have the disadvantages that the braking of the control rod occurs so suddenly as to possibly damage the control rod by the slowdown itself, and that too high a degree of mating accuracy between the control rod and the guide tube is necessary. In addition, the mutually associated installation of the control rod guide tubes and the fuel elements or fuel rods of the reactor core, cannot always be easily realized nor will the guide tubes be always readily accessible.

It is accordingly an object of our invention to provide hydraulic fall-brake or shock absorber for nuclear reactor control rods which avoids the aforementioned disadvantages of the heretofore known devices of that type and which more particularly avoids the possibility of any damage to the control rod proper or to the reactor core into which the control rods are suddenly dropped when deactivating the reactor.

With the foregoing and other objects in view, we provide in accordance with our invention, a hydraulic fall-brake or shock absorber for nuclear reactor control rods, particularly for water-cooled reactors having a vertically extending control rod guide tube provided with bores for the passage of coolant. The control rod guide tube is cylindrical along its entire length and is provided at its lower end with cylindrical constrictions located spaced from one another. The inner diameter of the respective constrictions in a direction toward the lower end of the guide tube, is made progressively smaller so that the annular gap remaining opposite the cylindrical end of the falling control rod produces for the displaced coolant a respectively greater flow resistance with accordingly adjustable characteristic. The control rod guide tube is closed beneath the cylindrical constrictions and is provided above them with lateral bores for the passage of coolant. The control rod proper can have a continuous cylindrical shape or it can have one or more cylindrical thickened portions at its lower end, the length of these thickened portions being in the order of magnitude of the diameters thereof.

The features that are considered to be characteristic of the invention are set forth in the appended claims.

Although the invention has been illustrated and described herein as embodied in hydraulic fall-brake or shock absorber for nuclear reactor control rods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
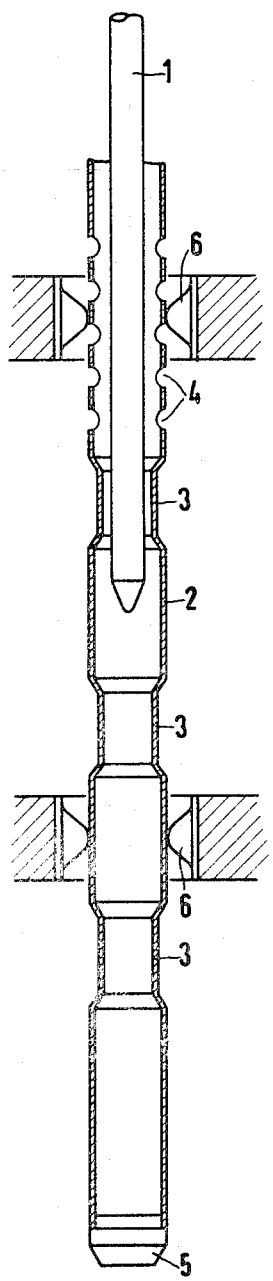
FIG. 1 is a schematic longitudinal view of an embodiment of the fall-brake or shock absorber of our invention showing one type of control rod to be used therewith.

Referring now to the drawing and first particularly to FIG. 1 thereof, there is shown a control rod 1 inserted in a control rod guide tube 2. With the aid of spacer members 6, such as a spacer ring of suitable construction, the guide tube is held in the grid plate or grating of a nuclear fuel element or reactor core in accordance with generally and conventionally known constructions. Due to the unbroken i.e. continuous, cylindrical shape of the guide tube, which may, moreover, have the same diameter as that of a conventional reactor fuel rod, the same spacers 6 can be employed along any location thereof, a feature that is of particular advantage with respect to construction, assembly and interchangeability of the individual elements. The guide tube 2 is provided with cylindrical constrictions 3 forming a braking zone thereon. Above these constrictions 3, the guide tube 2 is provided with a row of bores 4 through which coolant, usually water, can penetrate for removing the heat produced in the control rod. The lower end of the guide tube 2 is closed by a plug 5. As an example of the approximate dimensions of such a device as is shown in FIG. 1, it may be noted that the control rod guide tube can have a length of several meters for a diameter of for example 10 to 15 millimeters. The length of the constrictions 3 is in the order of magnitude of the diameter thereof. The spacing between the constrictions can be about 10 to 15 centimeters for example. The number of constrictions provided in the guide tube 2 depends upon the kinetic energy of the control rods whose fall is to be braked. The annular gaps formed between the control rod and the constrictions when the control rod falls into the braking zone have a width of about 1 to 0.1 millimeter. By providing a suitably graduated dimensioning of these constrictions 3 it is then possible to form the exact braking characteristic desired.

Figure 2:
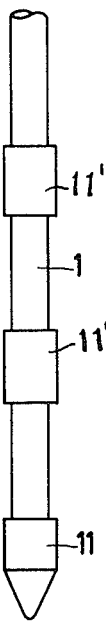
FIG. 2 is a longitudinal view of a modified control rod which may be used with the shock absorber of FIG. 1.

A reinforced or beefed-up head of a control rod 1 is shown in FIG. 2. The reinforcement 11 is cylindrical and, for example, has a length that is in the order of magnitude of the rod diameter. The use of such a reinforced control rod head has the advantage that the control rod proper can be constructed with less dimensional accuracy. In addition to a first widened or thickened portion 11 located at the head of the control rod in FIG. 2, additional widened portions 11' can be provided on the control rod so that narrow gaps between the control rod and the constrictions in the control rod guide tube are formed at several locations along the length of the tube and a further improvement and smoothing of the brake action is thereby achieved.

Figure 3A:
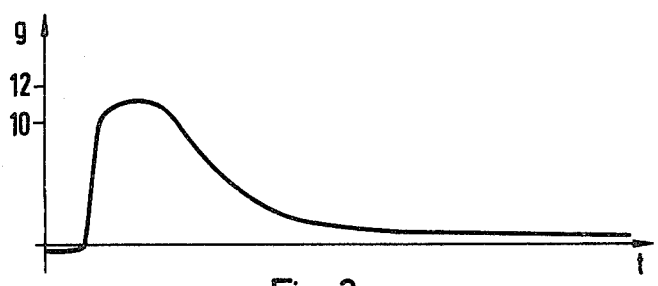
FIG. 3a is a plot of the braking or retarding action produced by shock absorbing devices in the heretofore known types.
Figure 3B:
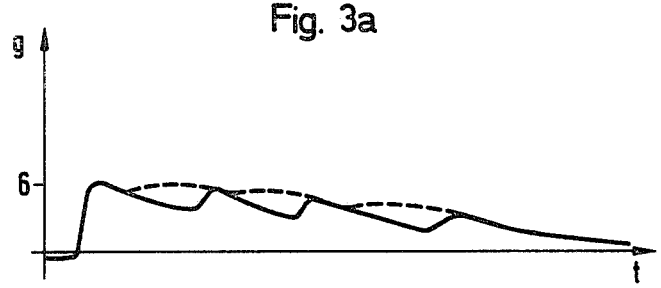
FIG. 3b is a plot of the braking or retarding action produced by the shock absorber of our invention.

The action of a shock absorber produced in accordance with our invention compared to a known embodiment having a simple continuous narrowing of the control rod guide tube in the braking zone is shown in FIGS. 3a and 3b. Thus, at the beginning of the braking operation, with one of the devices according to the present state of the art, a slow-down force of about 10 to 12 grams is effected as shown in FIG. 3a. For constructional reasons, as aforementioned, this value is too high. FIG. 3b shows the shock absorber characteristic in accordance with a device embodying the invention of the instant application which has four constrictions 3. From FIG. 3b it can be noted that the initial slowdown force is only about half that of the aforementioned heretofore known device, and that at the end of a braking path of the same length and also, in this case, at the end of the same braking period as that of FIG. 3a, the same braking action is nevertheless produced. The slowdown force peak shown in FIG. 3a was reduced in the case of the repeatedly constricted shock absorbers by providing a suitably large spacing between rod and guide tube. Due to respective narrower spacing between the control rod and successive constrictions of the guide tube, maintenance of the guide tube, maintenance of the slow-down or retardation of the falling rod is ensured for a simultaneously reduced rod velocity. The characteristic shown in FIG. 3b thus closely approaches the ideal slowdown characteristic whereby the retardation of the control rod fall is constant during the entire braking period. The curve shown by the dotted line in FIG. 3b indicates the possible additional improvement attainable by employing additional cylindrical thickened portions on the control rod.

In summary it is to be noted that guide tubes can be produced simply and very accurately with these shock absorber devices, and that due to their simple cylindrical shape, it is possible to install and manipulate them in reactor cores in the same manner as the manipulation and installation of the reactor fuel rods proper are effected. Functionally speaking, they permit an equally good braking of the falling control rods as shock absorber devices produced heretofore in accordance with the state of the art prior to our invention. In addition, however, they avoid an over-sized or excessively high slowdown force peak. The characteristic thus comes closer to the ideal case of a constant slow-down or retardation. Herewith, the final speed of the falling control rod also becomes so low that for the most part the additional mechanical spring dampers, heretofore conventionally required, can now be dispensed with. This construction also has the advantage that the spacing between control rod and the constrictions of the guide tube can be subsequently varied so that even after manufacture of the control rod guide tubes, a change in the damping effect is obtainable. By accommodating this individual staging or graduating of the gaps between rod and constrictions to the respective rod velocity, the adjustment of an optimum braking or damping action can be effected.

Shock absorber devices constructed in accordance with our invention are naturally not limited to the dimensions that were given herein as an example applicable to so-called finger control rods that are located in the fuel elements of the reactor core. Such shock absorber devices can also find application for larger control rods which are conventionally disposed between the individual fuel elements in the reactor core. Notwithstanding the fact that for manufacturing reasons the control rod and the guide tube have cylindrical shape, it must also be noted that the principles of our invention are applicable in an analogous manner, also to control rods having different cross sections, such as cross-shaped cross sections, and correspondingly shaped guide tubes.

We claim:

1. In a nuclear reactor cooled by a fluid coolant, an hydraulic shock absorber for a control rod comprising a vertically extending guide tube for guidingly receiving a falling control rod, said guide tube being cylindrical substantially along the entire length thereof and being formed in one piece with longitudinally spaced substantially right-circular cylindrical constructions at the lower end thereof, and means for passing the fluid coolant of the reactor through said guide tube, the inner diameters of said constrictions, respectively, being progressively smaller in a direction toward the lower end of said guide tube so that the cylindrical end of a control rod guidingly falling in said guide tube defines with said constrictions annular gaps, respectively, of ever decreasing width within said guide tube whereby the fluid coolant displaced through said annular gaps is subjected to increasingly greater flow resistance in said guide tube providing an adjustable damping characteristic.

2. In a nuclear reactor according to claim 1 wherein said guide tube is formed with a plurality of bores for passage of coolant fluid therethrough.

3. In a nuclear reactor according to claim 1 wherein the reactor is fluid-cooled, said guide tube being closed below said cylindrical constrictions thereof and being formed with a plurality of lateral bores above said cylindrical constrictions thereof for passage of coolant fluid therethrough.

4. In a nuclear reactor according to claim 1, said control rod having at its lower end in said guide tube a cylindrical widened portion of a length substantially in the order of magnitude of the diameter thereof.

5. In a nucelar reactor according to claim 1, said control rod having a plurality of cylindrical widened portions along a length thereof located in the vicinity of said guide tube constrictions in the fallen position of said control rod.

6. In a nuclear reactor according to claim 1, including means for supporting said guide tube in the vertical position thereof, said support means being in engagement with said guide tube in the region thereof between said constrictions.

7. In a nuclear reactor according to claim 6, said supporting means including at least two vertically spaced grid plates, said guide tube being inserted in respective aligned grid openings of said plates, and spacer members located in said grid openings and projecting inwardly into engagement with said guide tube at portions thereof located between said constrictions so as to support said guide tube vertically in the reactor.

(References on following page)

References Cited

UNITED STATES PATENTS

| | | | |
|---|---|---|---|
| 1,584,884 | 5/1926 | Merrick | 188—96.6 |
| 3,314,859 | 4/1967 | Anthony | 176—36 |
| 3,321,373 | 5/1967 | Challender | 176—36 |

FOREIGN PATENTS

| | | | |
|---|---|---|---|
| 1,199,896 | 9/1965 | Germany | 176—36 |
| 903,289 | 8/1962 | Great Britain | 176—36 |

OTHER REFERENCES

ANL–6034, 1960, pp. 28, 29, 31–34, 45–47.

CARL D. QUARFORTH, Primary Examiner

H. E. BEHREND, Assistant Examiner

U.S. Cl. X.R.

92—8; 188—88.506, 96.6